United States Patent
Senner et al.

(10) Patent No.: US 8,920,999 B2
(45) Date of Patent: Dec. 30, 2014

(54) MULTIPLE INJECTOR AND EJECTOR ARRAY

(75) Inventors: Ralph Senner, Pittsford, NY (US); Benno Andreas-Schott, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1465 days.

(21) Appl. No.: 11/956,899

(22) Filed: Dec. 14, 2007

(65) Prior Publication Data
US 2009/0155641 A1 Jun. 18, 2009

(51) Int. Cl.
*H01M 8/24* (2006.01)
*H01M 8/04* (2006.01)

(52) U.S. Cl.
CPC ............ *H01M 8/04097* (2013.01); *Y02E 60/50* (2013.01)
USPC .......................................... 429/454; 429/512

(58) Field of Classification Search
CPC combination set(s) only.
See application file for complete search history.

(56) References Cited

U.S. PATENT DOCUMENTS

| | | | |
|---|---|---|---|
| 3,186,167 A * | 6/1965 | Chute | 60/39.281 |
| 5,150,690 A * | 9/1992 | Carter et al. | 123/527 |
| 5,316,871 A | 5/1994 | Swathirajan et al. | |
| 5,802,848 A | 9/1998 | McClendon et al. | |
| 2005/0064255 A1* | 3/2005 | Blaszczyk et al. | 429/19 |
| 2006/0024548 A1* | 2/2006 | Pechtold et al. | 429/34 |

FOREIGN PATENT DOCUMENTS

| | | |
|---|---|---|
| DE | 10322967 A1 | 2/2004 |
| DE | 10354907 A1 | 6/2004 |
| DE | 102006037799 A1 | 3/2008 |
| DE | 102007004590 A1 | 7/2008 |

* cited by examiner

*Primary Examiner* — Ula C. Ruddock
*Assistant Examiner* — Daniel Gatewood
(74) *Attorney, Agent, or Firm* — Fraser Clemens Martin & Miller LLC; J. Douglas Miller

(57) ABSTRACT

A fluid injection/ejection system for a fuel cell stack is disclosed, wherein the system includes an array of injectors and ejectors that support hydrogen recirculation and maximize a use of the hydrogen and an efficiency of the fuel cell stack.

20 Claims, 4 Drawing Sheets

MULTIPLE INJECTOR AND EJECTOR ARRAY

FIELD OF THE INVENTION

The present invention relates to a fuel cell system and more particularly to a fluid injection/ejection system including an array of injectors and ejectors disposed in the fuel cell system that facilitate hydrogen recirculation and maximize the use thereof.

BACKGROUND OF THE INVENTION

A fuel cell is an electrochemical device that includes an anode and a cathode with an electrolyte disposed therebetween. The anode receives a fuel such as hydrogen gas and the cathode receives an oxidant such as oxygen or air. Typically, a main hydrogen passage provides communication between a source of hydrogen and the anode. Several fuel cells are combined in a fuel cell stack to generate a desired amount of electrical power. A fuel cell stack for a vehicle may include several hundred individual cells.

Oxygen not consumed in the fuel cell stack is expelled as a cathode exhaust gas that may include water as a stack by-product. Hydrogen not consumed in the stack may be recirculated to the main hydrogen passage via a fuel recirculation passage. An amount of undesirable nitrogen is also present in the unused hydrogen exiting the fuel cell. Before reintroducing the unused hydrogen back into the main hydrogen passage, a portion of the hydrogen/nitrogen mixture is exhausted into the atmosphere. This can be accomplished by a bleed valve, for example. Hydrogen and nitrogen that are not exhausted into the atmosphere through the bleed valve can be reintroduced to the main hydrogen supply via the fuel recirculation passage. The fuel recirculation passage provides fluid communication between the outlet of the fuel cell and the main hydrogen passage to allow unused hydrogen to be reintroduced to the anode. In fuel cell stacks of the prior art, an electric pump is used to recirculate the hydrogen/nitrogen mixture back into the main hydrogen passage.

It has been a continuing challenge to provide an efficient and cost effective method of reintroducing the unused hydrogen back into the main hydrogen passage. Space in and around the fuel cell stack is extremely limited and valued, especially in vehicular applications. Further, the electric pump used to reintroduce the unused hydrogen back into the main hydrogen passage utilizes electrical power generated by the fuel cell stack, thereby decreasing overall efficiency.

To reduce a power consumption of the electric pump, pulsed injectors which alternate between an open and closed position have been used in fuel cell systems to introduce fuel from the fuel source to the fuel cell stack. While pulsed injectors have been successful at reducing the power consumption of the electric pump, there is a need to minimize the time the injector is closed and maximize the time the ejector is used at low power.

It would be desirable to produce a fuel cell stack assembly including an array of injectors and ejectors that support hydrogen recirculation and maximize the use thereof, wherein the use of an electric pump is eliminated.

SUMMARY OF THE INVENTION

In concordance and agreement with the present invention, a fuel cell stack assembly including an array of injectors and ejectors that support hydrogen recirculation and maximize the use thereof, wherein the use of an electric pump is eliminated, has surprisingly been discovered.

In one embodiment, the fluid injection/ejection system comprises a first injector adapted to receive a first stream of a first fluid from a source of fluid and inject the first stream of the first fluid into a first chamber; a first ejector having a passage formed therein, the passage having an inlet in fluid communication with the first chamber and an outlet in fluid communication with a second chamber; a second injector adapted to receive a second stream of the first fluid from the source of fluid and inject the second stream of the first fluid into the second chamber; and a second ejector including a passage formed therein, the passage having an inlet and an outlet, wherein the inlet is in fluid communication with the second chamber.

In another embodiment, the fluid injection/ejection system for a fuel cell system comprises a first injector having an inlet and an outlet formed therein, wherein the inlet is in fluid communication with a source of fluid and the outlet is in fluid communication with a first chamber; a first ejector including a check valve and a venturi passage formed therein, the venturi passage having an inlet in fluid communication with the first chamber and an outlet in fluid communication with a second chamber; a second injector having an inlet and an outlet formed therein, wherein the inlet is in fluid communication with the source of fluid and the outlet is in fluid communication with the second chamber; and a second ejector including a venturi passage formed therein, the venturi passage having an inlet in fluid communication with the second chamber and an outlet in fluid communication with a third chamber, the third chamber having an outlet in fluid communication with a fuel cell, wherein at least one of the first chamber and the second chamber includes a fuel recirculation inlet formed therein adapted to receive a second fluid therein in response to a flow of the first fluid through the venturi passage of at least one of the first ejector and the second ejector, the second fluid combining with the first fluid to form a fluid mixture.

In another embodiment, the fluid injection/ejection system for a fuel cell system comprises a small scale injector having an inlet and an outlet formed therein, wherein the inlet is in fluid communication with a source of fluid and the outlet is in fluid communication with a first chamber; a first ejector including a check valve and a venturi passage formed therein, the venturi passage having an inlet in fluid communication with the first chamber and an outlet in fluid communication with a second chamber; a full scale injector having an inlet and an outlet formed therein, wherein the inlet is in fluid communication with the source of fluid and the outlet is in fluid communication with the second chamber; and a second ejector including a venturi passage formed therein, the venturi passage having an inlet in fluid communication with the second chamber and an outlet in fluid communication with a third chamber, the third chamber having an outlet in fluid communication with a fuel cell, wherein at least one of the first chamber and the second chamber includes a fuel recirculation inlet formed therein adapted to receive a second fluid therein in response to a flow of the first fluid through the venturi passage of at least one of the first ejector and the second ejector, the second fluid combining with the first fluid to form a fluid mixture.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
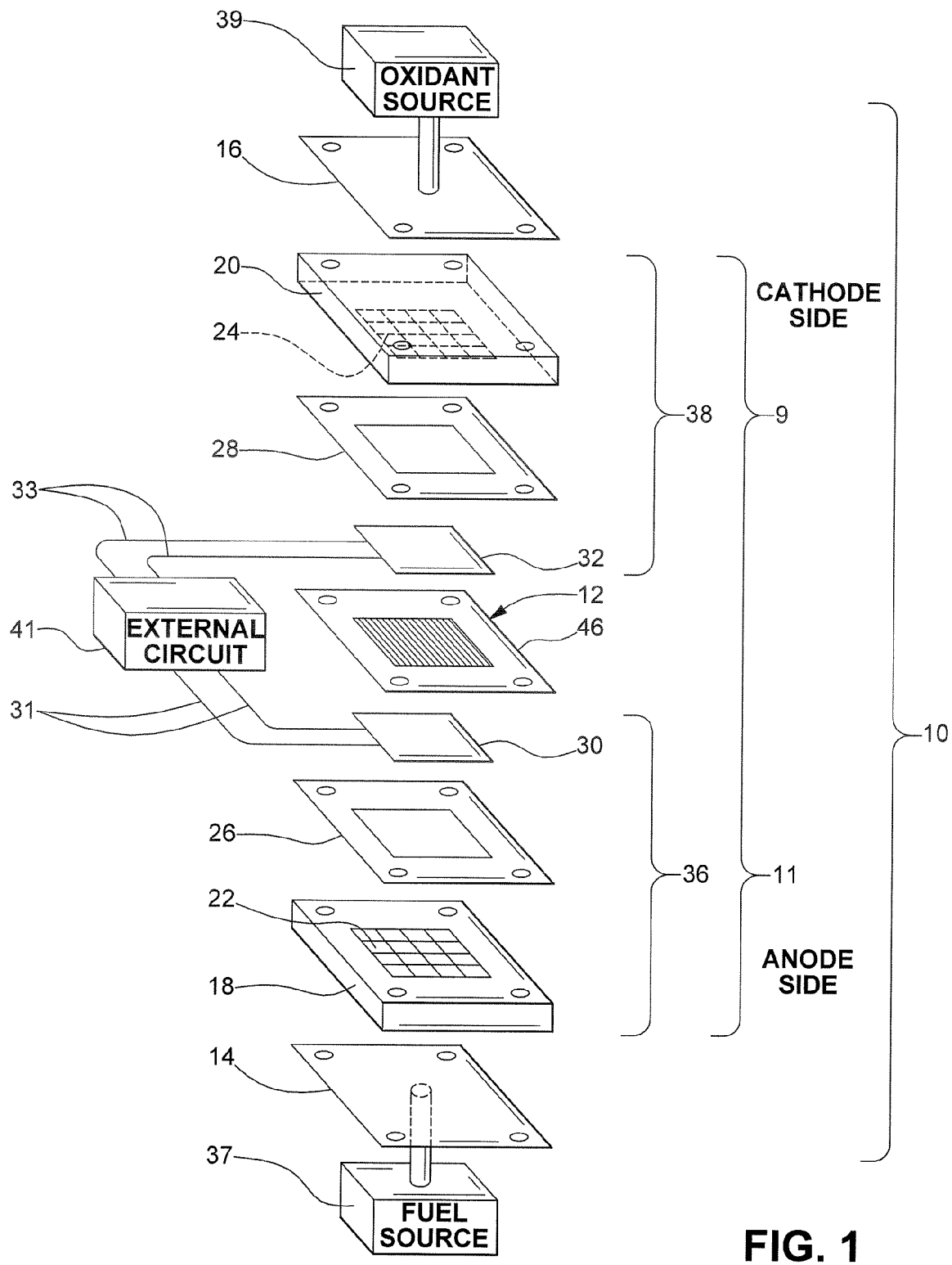
FIG. 1 is a schematic exploded perspective view of a fuel cell system according to the prior art.

FIG. 1 shows a fuel cell 10 having a cathode side 9 and an anode side 11. The cathode side 9, the anode side 11, and a coolant system (not shown) are collectively referred to as a wet end of the fuel cell 10. Insulation end plates 14, 16 are referred to as a dry end of the fuel cell 10. The fuel cell 10 is in fluid communication with a fuel source 37 and an oxidant source 39. Graphite blocks 18, 20 having a plurality of openings 22, 24 to facilitate fluid distribution are disposed adjacent the insulation end plates 14, 16. Gaskets 26, 28 and carbon cloth current collectors 30, 32 having respective electrical connections 31, 33, are respectively disposed between a membrane electrode assembly (MEA) 12 and the blocks 18, 20. An oxidant and current transport means 36 is made up of the graphite block 18, the gasket 26, and the current collector 30. A fuel and current transport means 38 is made up of the graphite block 20, the gasket 28, and the current collector 32. The anode connection 31 and the cathode connection 33 are used to interconnect the fuel cell 10 with an external circuit 41 and may include other fuel cells (not shown) as desired.

A fuel cell stack (not shown) is constructed of a plurality of fuel cells 10 connected in series. Once a desired number of fuel cell 10 pairs are joined together to form the fuel cell stack, the stack is provided with the coolant system. A fuel cell stack as described herein is commonly used as a power plant for the generation of electric power in a vehicle, for example.

In use, a fuel such as hydrogen is supplied from the fuel source 37 and an oxidant such as oxygen is supplied from the oxidant source 39. The fuel and oxidant from respective sources 37, 39 diffuse through respective fluid and current transport means 36, 38 to opposing sides of the MEA 12. Porous electrodes (not shown) form an anode at the anode side 11 and a cathode at the cathode side 9, and are separated by a Proton Exchange Membrane (PEM) 46. The PEM 46 provides for ion transport to facilitate a chemical reaction in the fuel cell 10. Typically, the PEM 46 is produced from copolymers of suitable monomers. Such proton exchange membranes may be characterized by monomers of the structures:

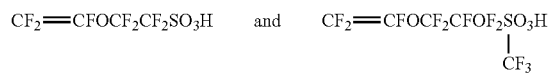

Such a monomer structure is disclosed in detail in U.S. Pat. No. 5,316,871, hereby incorporated herein by reference in its entirety.

Figure 2:
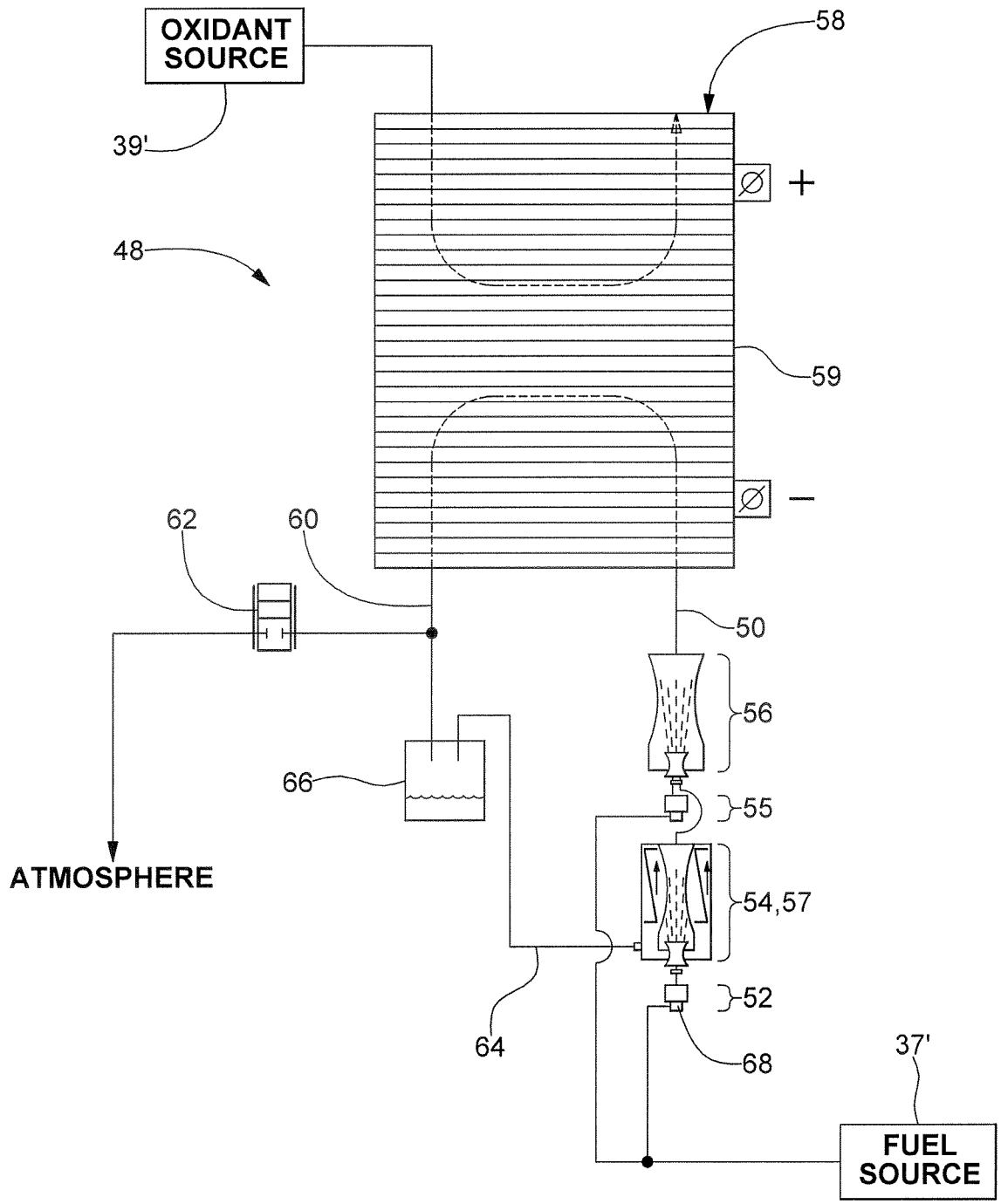
FIG. 2 is a schematic flow diagram of a fuel cell system in accordance with an embodiment of the invention.
Figure 3:
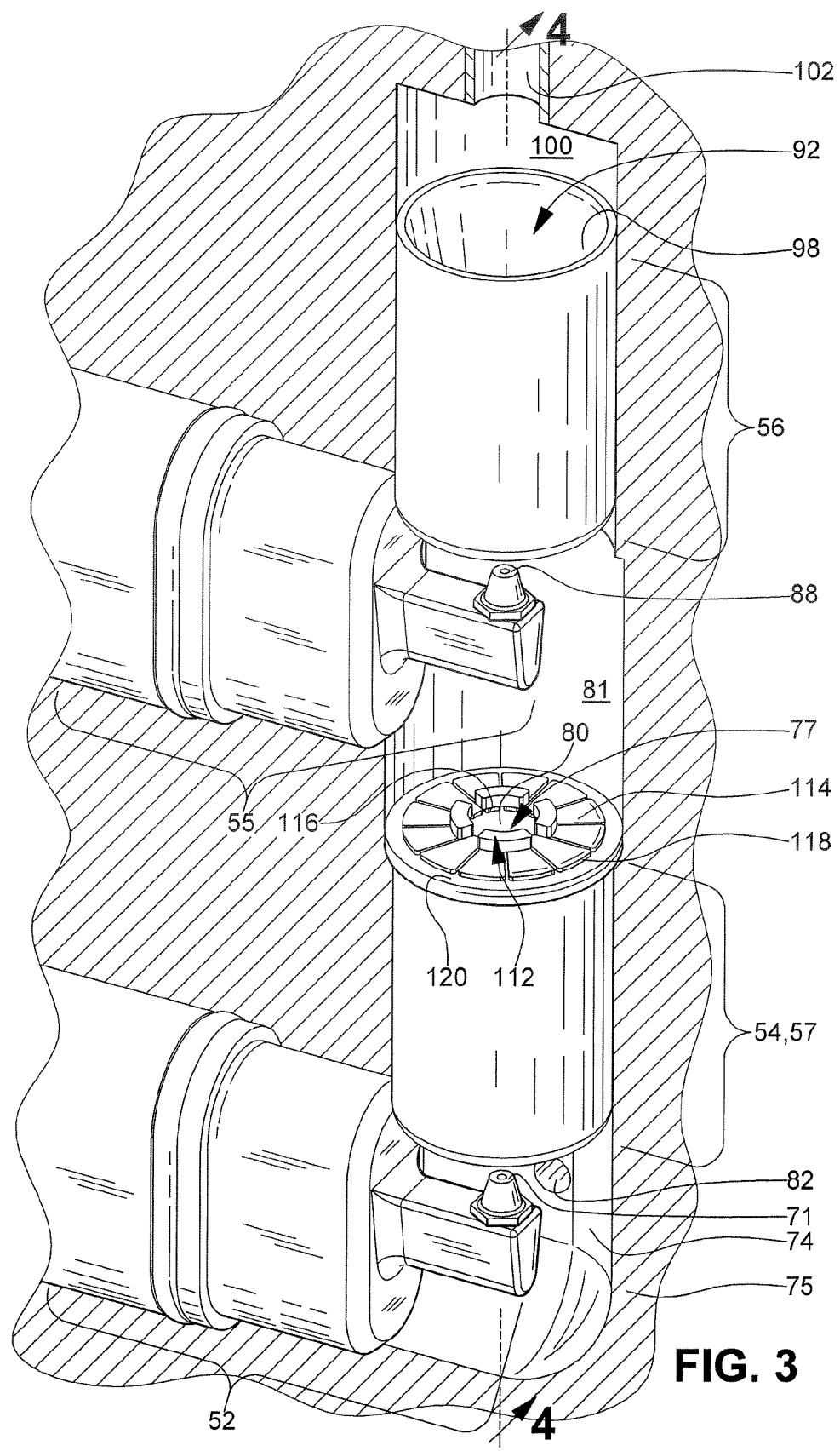
FIG. 3 is a perspective view of an array of injectors and ejectors in the fuel cell system illustrated in FIG. 2.

FIG. 2 shows a flow diagram of a fuel cell system 48 in accordance with an embodiment of the invention. Similar structure to that described above for FIG. 1 includes the same reference number followed by a prime (') symbol. The fuel cell system 48 includes a fuel source 37', an oxidant source 39', and a main fuel passage 50. The fuel source 37' supplies a fuel to a first injector 52. The first injector 52 and an associated first ejector 54 are in fluid communication with a second injector 55 and an associated second ejector 56. Although the first injector 52 and the first ejector 54 are disposed in a linear array respective to the second injector 55 and the second ejector 56, it is understood that the injectors 52, 55 and the ejectors 54, 56 can be disposed as desired. In the embodiment shown, the first injector 52 is a so-called small scale injector adapted for use during low stack current (e.g. 30% stack current) and the second injector 55 is a so-called full scale injector adapted for use during high stack current (e.g. 100% stack current). It is understood that the first injector 52 and the second injector 55 can be other injector types as desired and can be employed during any stack current level. The first ejector 54 includes an integrated check valve assembly 57 as illustrated in FIG. 3. A fuel cell stack 58 forms at least a part of the main fuel cell passage 50 and includes one or more fuel cells 59 as described above for FIG. 1. The fuel cell system 48 also includes an exhaust passage 60, a bleed valve 62, a fuel recirculation passage 64, and a water separator 66. The fuel cell stack 58 forms at least a part of the exhaust passage 60. The bleed valve 62 provides fluid communication between the exhaust passage 60 and the atmosphere. Fluid communication between the exhaust passage 60 and the ejector 54 is provided by the fuel recirculation passage 64. Water present in the fluid flowing from the fuel cell stack 58 to the ejector 54 is removed by the water separator 66.

Figure 4:
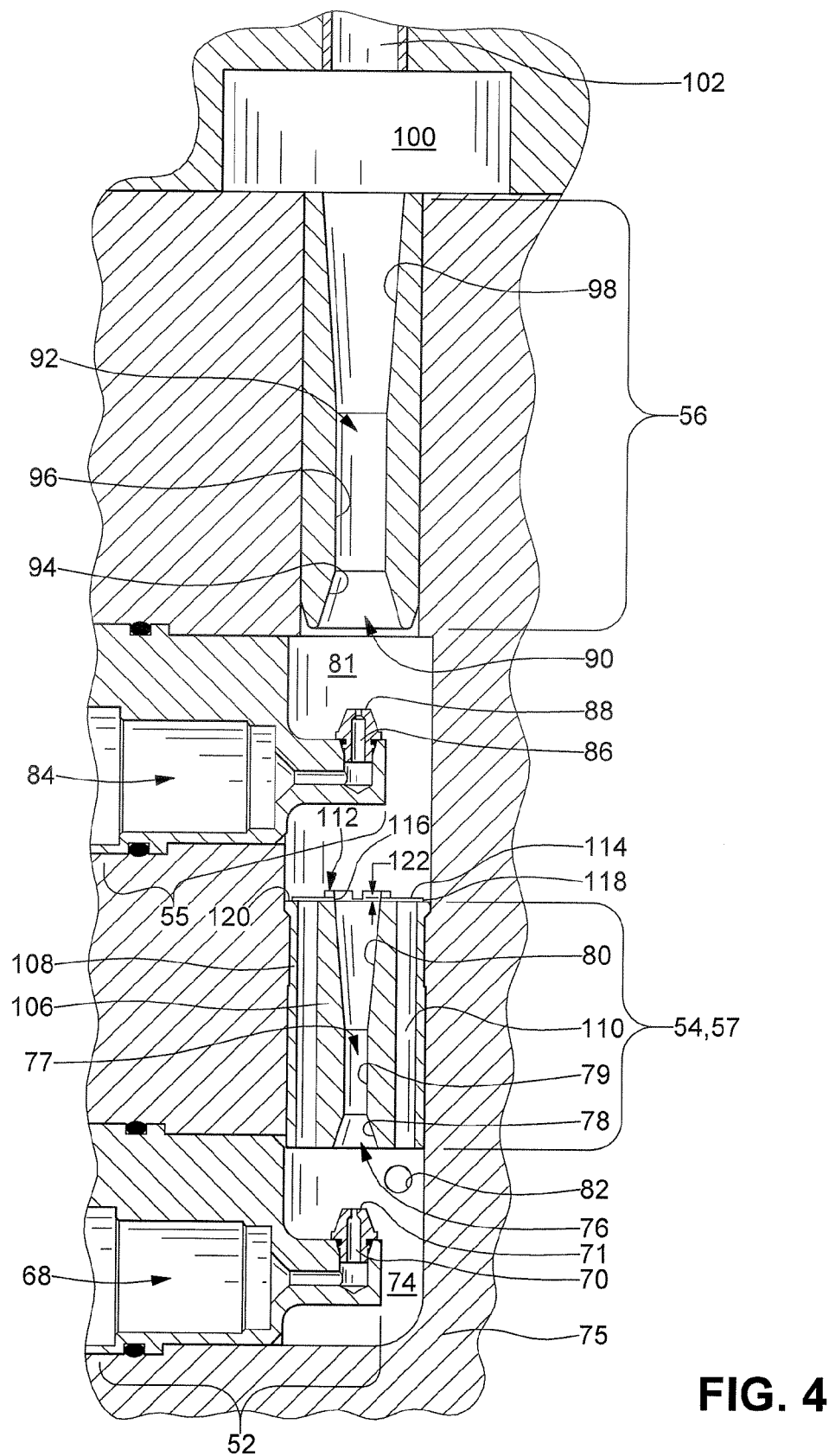
FIG. 4 is a cross-sectional view of the injectors and ejectors illustrated in FIG. 3 taken along line 4-4.

As illustrated in FIGS. 3 and 4, the first injector 52 includes a fluid inlet 68 and a spaced apart fluid outlet 70 that includes a nozzle 71. The fluid inlet 68 is in fluid communication with the fuel source 37'. The fluid outlet 70 is in fluid communication with a first chamber 74 formed in an end unit 75 of the fuel cell system 48.

The first chamber 74 is in fluid communication with an inlet 76 of the first ejector 54. The first ejector 54 includes a venturi passage 77 formed therein. A similar venturi passage is shown in commonly owned U.S. Pat. No. 5,802,848, hereby incorporated herein by reference in its entirety. The venturi passage 77 includes a convergent portion 78, a throat 79, and a diffuser portion 80. The nozzle 71 of the first injector 52 is substantially aligned with the throat 79 of the venturi passage 77. The venturi passage 77 provides fluid communication between the first chamber 74 and a spaced apart second chamber 81 formed in the end unit 75 of the fuel cell system 48. In the embodiment shown, a recirculation aperture 82 is formed in a wall of the first chamber 74. It is understood that other recirculation apertures can be formed elsewhere as desired. The recirculation aperture 82 facilitates fluid communication between the fuel recirculation passage 64 and the first chamber 74.

The second injector 55 includes a fluid inlet 84 and a spaced apart fluid outlet 86 that includes a nozzle 88. The fluid inlet 84 is in fluid communication with the fuel source 37'. The fluid outlet 86 is in fluid communication with the second chamber 81.

The second chamber 81 is in fluid communication with an inlet 90 of the second ejector 56. The second ejector 56 includes a venturi passage 92 formed therein. The venturi passage 92 includes a convergent portion 94, a throat 96, and a diffuser portion 98. The nozzle 88 of the second injector 55 is substantially aligned with the throat 96 of the venturi passage 92. The venturi passage 92 provides fluid communication between the second chamber 81 and a spaced apart third chamber 100 formed in the end unit 75 of the fuel cell system 48. The third chamber 100 is in fluid communication with the diffuser portion 98 of the venturi passage 92 and an outlet 102 of the second ejector 56. The outlet 102 of the second ejector 56 is in fluid communication with the fuel cell stack 58 by means of the main fuel passage 50.

The check valve assembly 57 is integrated with the first ejector 54 as shown in FIG. 4. Alternatively, the check valve assembly 57 can be integrated with a combination injector and ejector (not shown) and the second ejector 56 if desired. A combination injector and ejector is disclosed in commonly owned U.S. Pat. App. Pub. No. 2006/0024548, hereby incorporated herein by reference in its entirety. The check valve assembly 57 includes a valve body 106 which is an integral part of the first ejector 54 and surrounds the venturi passage 77. A valve housing 108 surrounds the valve body 106. In the embodiment shown, the valve body 106 is formed integrally with the valve housing 108. It is understood that the valve body 106 and the valve housing 108 can be formed separately without departing from the scope and spirit of the invention.

The valve body 106 includes an annular array of check valve passages 110 formed therein. It is understood that a desired number of check valve passages 110 as determined by a desired flow rate through the check valve passages 110 can be formed in the valve body 106. It is further understood that other configurations of check valve passages 110 can be formed in the valve body 106 as desired. The check valve passages 110 can also be formed in the valve housing 108, or between the valve body 106 and the valve housing 108. The check valve passages 110 provide fluid communication between the first chamber 74 and the second chamber 81.

The check valve assembly 57 also includes a flap valve 112 disposed at a downstream end of the valve body 106 and the valve housing 108, although other valve types can be used as desired. In the embodiment shown, the flap valve 112 is formed from rubber and includes a plurality of flaps or petals 114 adapted to form a substantially fluid tight seal with the valve housing 108 forming the check valve passages 110. It is understood that the flap valve 112 may be formed from other materials and have other shapes and configurations as desired such as a flat disc, for example. An inner edge 116 of the flap valve 112 is attached to the first ejector 54 by any conventional attaching means such as clamping, for example. It is also understood that an outer edge 118 of the flap valve 112 can be attached to the first ejector 54, if desired. When in a closed position, the flap valve 112 sealingly engages a seating surface 120 of the valve housing 108. Optionally, the seating surface 120 can be substantially concave shaped for receiving the flap valve 112 therein. In the embodiment shown, a recess 122 is formed in the first ejector 54 secure the inner edge 116 of the flap valve 112.

In use during low stack current, the fuel source 37' provides the fuel to the first injector 52. The fuel flows through the nozzle 71 where a velocity thereof is increased. The fuel then flows into the first chamber 74, and into the venturi passage 77 of the first ejector 54. As the fuel passes through the venturi passage 77, the fuel builds pressure and a velocity thereof decreases, which creates a suction effect. Accordingly, the pressure in the second chamber 81 is higher than the pressure in the first chamber 74. This pressure difference creates a force that is exerted on the flap valve 112 in a direction from the second chamber 81 toward the first chamber 74, thus forcing the flap valve 112 against the seating surface 120 to a closed position. Because of the pressure difference between the first chamber 74 and the second chamber 81, the flow of fuel from the first chamber 74 to the second chamber 81 through the check valve passages 110 is militated against. The flow of fuel from the second chamber 81 to the first chamber 74 through the check valve passages 110 is also militated against.

The fuel then flows into the second chamber 81, and through the venturi passage 92 into the third chamber 100. Once the fuel has entered the third chamber 100, the fuel flows through the outlet 102. The fuel then flows to the fuel cell stack 58. Once in the fuel cell stack 58, a reaction between the oxidant from the oxidant source 39' and the fuel results in the creation of electrical energy. Fuel not consumed by the reaction is discharged through the exhaust passage 60.

In use during high stack current, the fuel source 37' provides the fuel to the second injector 55. The fuel flows through the nozzle 88 where a velocity thereof is increased. The fuel then flows into the second chamber 81, and into the venturi passage 92 of the second ejector 56. As the fuel passes through the venturi passage 92, the fuel builds pressure and a velocity thereof decreases, which creates a suction effect. Accordingly, the pressure in the third chamber 100 is higher than the pressure in the second chamber 81. However, the pressure difference between the second chamber 81 and the first chamber 74 is minimal. Thus, a force exerted on the flap valve 112 is reduced. The reduced force causes the flaps 114 of the flap valve 112 to move to an open position. When the flaps 114 of the flap valve 112 are in the open position, the flow of fuel between the first chamber 74 to the second chamber 81 through the check valve passages 110 is permitted. While the flow of fuel from the first chamber 74 to the second chamber 81 is permitted, since the pressure is greater in the first chamber 74 than the pressure in the second chamber 81, the flow of fluid form the second chamber 81 to the first chamber 74 is militated against. Since flow to the second chamber 81 from the first chamber 74 is facilitated by both the venturi passage 77 and the check valve passages 110, an amount of fuel permitted to flow into the second chamber 81 and subsequently the third chamber 100 is maximized, which results in a minimization of a flow restriction of fuel into the fuel cell system 48.

Once into the third chamber 100, the fuel flows through the outlet 102. The fuel then flows to the fuel cell stack 58. Once in the fuel cell stack 58, a reaction between the oxidant from the oxidant source 39' and the fuel results in the creation of electrical energy. Fuel not consumed by the reaction is discharged through the exhaust passage 60.

Typically, nitrogen is present in the fuel during the reaction. The nitrogen flows along with the unused fuel through the exhaust passage 60. To maximize an efficiency of the fuel cell system 48, it is desirable to maintain an amount of nitrogen in the fuel cell system 48 at a predetermined level. Accordingly, if the amount of nitrogen flowing with the unused fuel is greater than a desired amount, a portion of the fuel/nitrogen mixture is exhausted into the atmosphere by means of the bleed valve 62. The suction effect produced by the flow of fluid through the venturi passages 77, 92 also causes the nitrogen/fuel mixture to flow through the fuel recirculation passage 64 and the recirculation aperture 82 into the first chamber 74. In the embodiment shown, the nitrogen/fuel mixture is then mixed in one of the first chamber 74 and the second chamber 81 during low stack current and high stack current, respectively, with fuel provided from the fuel source 37'. It is understood that the nitrogen/fuel mixture can be mixed in any chamber 74, 81, 100 as desired. The recirculated fuel/nitrogen mixture and the fuel from the fuel source 37' are then introduced into the fuel cell stack 58 as discussed above. Since the suction effect caused by the venturi passages 77, 92 circulates the unused fuel back to the fuel cell stack 58, an efficiency of the fuel cell system 48 is maximized. Any hydrogen unused in the fuel cell stack 58 can thereafter be recirculated as discussed above.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fluid injection/ejection system comprising:
    a first injector configured to receive a first stream of a first fluid from a source of fluid and inject the first stream of the first fluid into a first chamber;
    a first ejector having a venturi passage formed therein, wherein the venturi passage includes an inlet in fluid communication with the first chamber and an outlet in fluid communication with a second chamber;
    a check valve assembly integrated within the first ejector, the check valve assembly having a check valve passage and a valve, the check valve passage having an inlet in fluid communication with the first chamber and an outlet in fluid communication with the second chamber;
    a second injector configured to receive a second stream of the first fluid from the source of fluid and inject the second stream of the first fluid into the second chamber;
    a second ejector including a venturi passage formed therein, the venturi passage having an inlet and an outlet, wherein the inlet is in fluid communication with the second chamber; and
    wherein the first ejector is configured to facilitate a flow through the venturi passage formed therein and militate against a flow through the check valve assembly when a pressure in the second chamber is greater than a pressure in the first chamber, and is configured to facilitate the flow through each of the venturi passage formed therein and the check valve assembly when a pressure in the first chamber is greater than a pressure in the second chamber.

2. The fluid injection/ejection system according to claim 1, wherein the first injector and the first ejector are disposed in a linear array respective to the second injector and the second ejector.

3. The fluid injection/ejection system according to claim 1, wherein the second ejector includes a check valve formed therein.

4. The fluid injection/ejection system according to claim 1, wherein at least one of the first chamber and the second chamber is in fluid communication with a fluid recirculation passage.

5. The fluid injection/ejection system according to claim 4, wherein a second fluid is received in the one of the first chamber and the second chamber from the fluid recirculation passage in response to a flow of the first fluid through the venturi passage of at least one of the first ejector and the second ejector.

6. The fluid injection/ejection system according to claim 5, wherein the first fluid and the second fluid combine to form a fluid mixture.

7. The fluid injection/ejection system according to claim 5, wherein the second fluid is at least one of hydrogen, nitrogen, and water vapor.

8. The fluid injection/ejection system according to claim 1, wherein the outlet of the venturi passage of at least one of the first ejector and the second ejector is in fluid communication with a fuel cell.

9. The fluid injection/ejection system according to claim 1, wherein at least one of the first injector and the second injector is a small scale injector.

10. The fluid injection/ejection system according to claim 1, wherein at least one of the first injector and the second injector is a full scale injector.

11. The fluid injection/ejection system according to claim 1, wherein the first fluid is hydrogen.

12. A fluid injection/ejection system for a fuel cell system comprising:
    a first injector having an inlet and an outlet formed therein, wherein the inlet is in fluid communication with a source of a first fluid and the outlet is in fluid communication with a first chamber;
    a first ejector including a check valve assembly and a venturi passage formed therein, the check valve assembly having a check valve passage and a valve disposed therein, the check valve passage fluidly coupling the first chamber and a second chamber, the venturi passage fluidly coupling the first chamber and the second chamber, the venturi passage inlet in fluid communication with the first chamber and an outlet in fluid communication with the second chamber, wherein the first ejector is configured to facilitate a flow between the first chamber and the second chamber through the venturi passage and militate against a flow through the check valve passage when a pressure in the second chamber is greater than a pressure in the first chamber and the first ejector is configured to facilitate a flow between the first chamber and the second chamber through the venturi passage and through the check valve assembly when the pressure in the first chamber is greater than the pressure in the second chamber;
    a second injector having an inlet and an outlet formed therein, wherein the inlet is in fluid communication with the source of the first fluid and the outlet is in fluid communication with the second chamber; and
    a second ejector including a venturi passage formed therein, the venturi passage having an inlet in fluid communication with the second chamber and an outlet in fluid communication with a third chamber, the third chamber having an outlet in fluid communication with a fuel cell, wherein at least one of the first chamber and the second chamber includes a fuel recirculation inlet formed therein configured to receive a second fluid therein in response to a flow of the first fluid through the venturi passage of at least one of the first ejector and the second ejector, the second fluid combining with the first fluid to form a fluid mixture.

13. The fluid injection/ejection system according to claim 12, wherein the first fluid is hydrogen.

14. The fluid injection/ejection system according to claim 12, wherein the second fluid is at least one of hydrogen, nitrogen, and water vapor.

15. The fluid injection/ejection system according to claim 12, wherein at least one of the first injector and the second injector is a small scale injector.

16. The fluid injection/ejection system according to claim 12, wherein at least one of the first injector and the second injector is a full scale injector.

17. A fluid injection/ejection system for a fuel cell system comprising:
    a small scale injector having an inlet and an outlet formed therein, wherein the inlet is in fluid communication with a source of a first fluid and the outlet is in fluid communication with a first chamber;

a first ejector including an integrated check valve assembly and a venturi passage formed therein, the check valve assembly including at least one check valve passage having an inlet in fluid communication with the first chamber and an outlet in fluid communication with a second chamber, the check valve assembly further including a flap valve disposed at a downstream end of the check valve assembly, the venturi passage including an inlet in fluid communication with the first chamber and an outlet in fluid communication with the second chamber, wherein the flap valve is in a closed position when a pressure in the second chamber is greater than a pressure in the first chamber and the flap valve is in an open position when the pressure in the first chamber is greater than a pressure in the second chamber;

a full scale injector having an inlet and an outlet formed therein, wherein the inlet is in fluid communication with the source of the first fluid and the outlet is in fluid communication with the second chamber; and a second ejector including a venturi passage formed therein, the venturi passage having an inlet in fluid communication with the second chamber and an outlet in fluid communication with a third chamber, the third chamber having an outlet in fluid communication with a fuel cell, wherein at least one of the first chamber and the second chamber includes a fuel recirculation inlet formed therein configured to receive a second fluid therein in response to a flow of the first fluid through the venturi passage of at least one of the first ejector and the second ejector, the second fluid combining with the first fluid to form a fluid mixture.

18. The fluid injection/ejection system according to claim 17, wherein the first fluid is hydrogen.

19. The fluid injection/ejection system according to claim 17, wherein the second fluid is at least one of hydrogen, nitrogen, and water vapor.

20. The fluid injection/ejection system according to claim 1, wherein the valve is a flap valve.

* * * * *